(No Model.)　　　　　　　　　　　　　　　　　　　4 Sheets—Sheet 1.
J. TIFFANY.
BRICK MACHINE.
No. 309,367.　　　　　　　　　　　Patented Dec. 16, 1884.
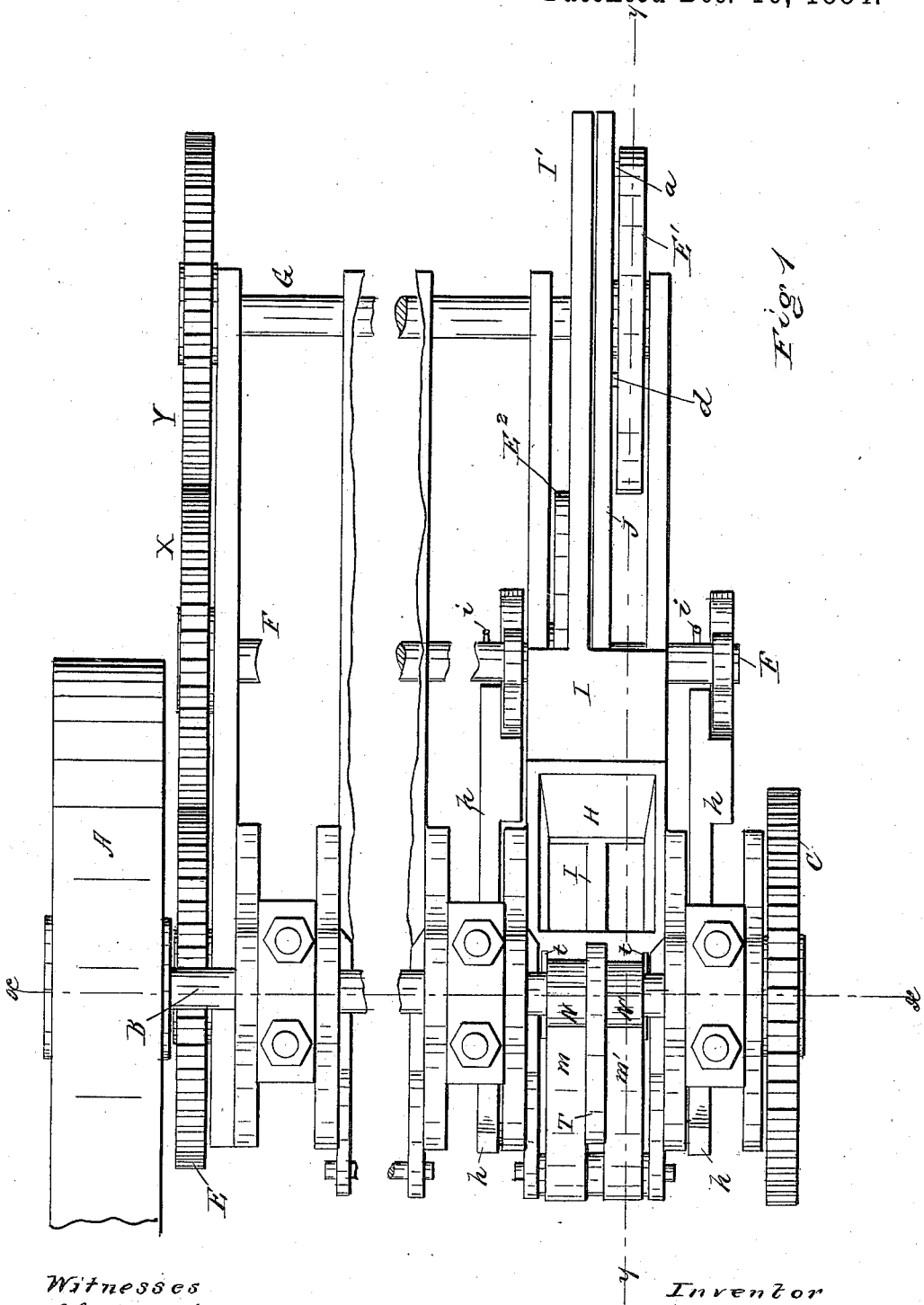
Witnesses
P. E. Remsen
W. C. Coolies
Inventor
Joel Tiffany
By Coburn & Thacher
Attorneys

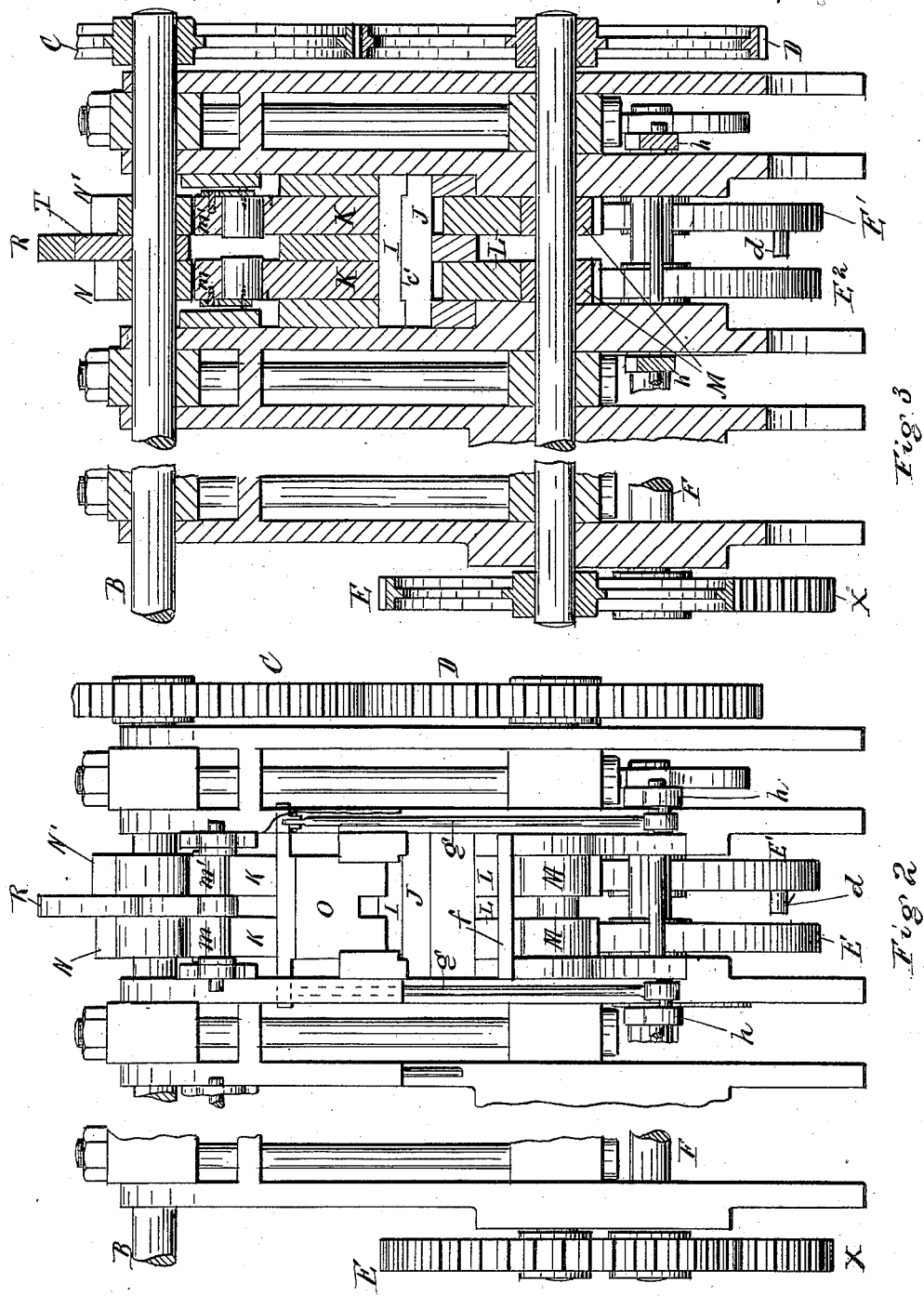

(No Model.) 4 Sheets—Sheet 3.
J. TIFFANY.
BRICK MACHINE.
No. 309,367. Patented Dec. 16, 1884.
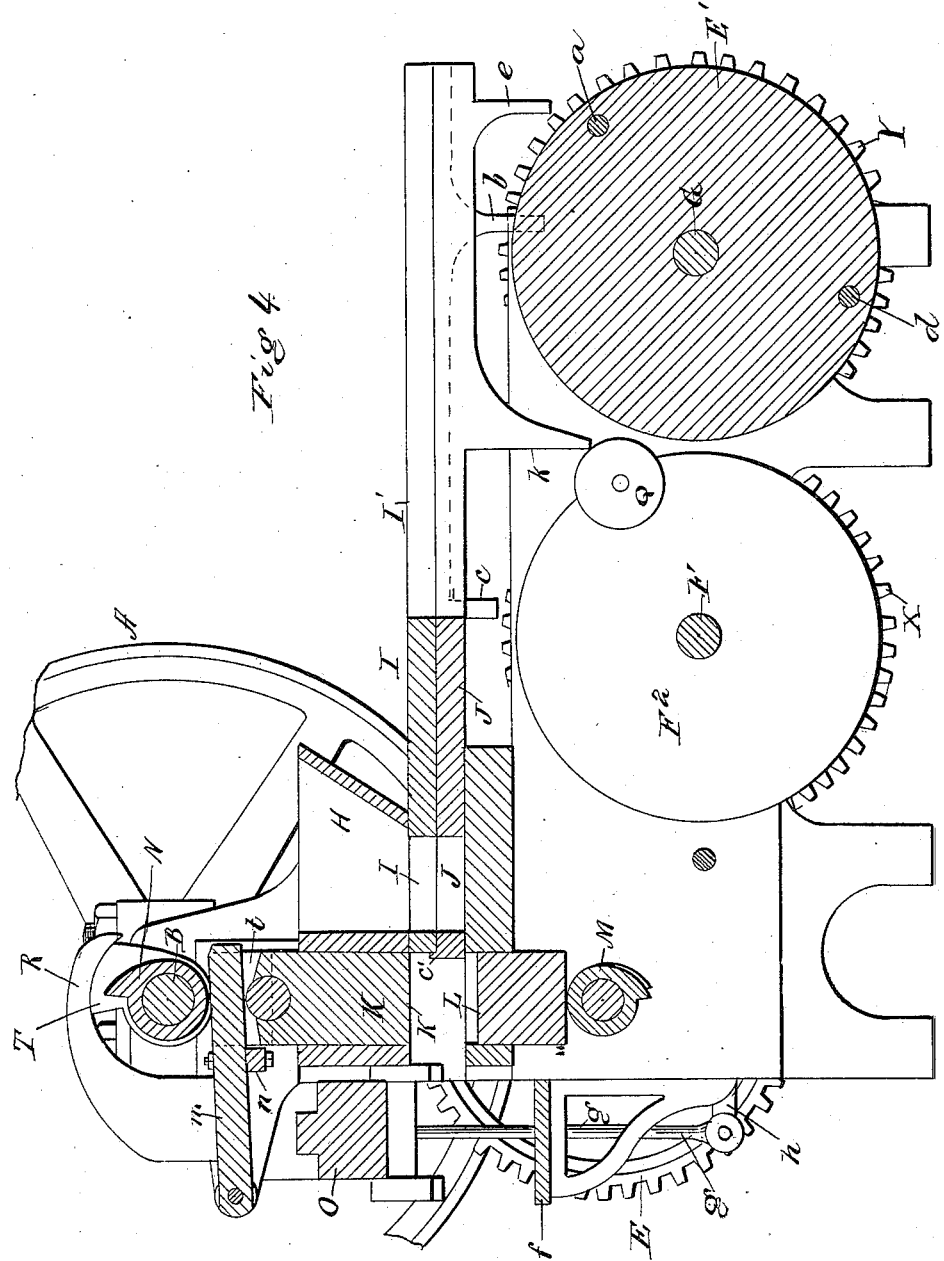
Witnesses
P. E. Rennens
W. C. Corlies
Inventor
Joel Tiffany
By Coburn & Thacher
Attorneys
N. PETERS, Photo-Lithographer, Washington, D. C.

(No Model.) 4 Sheets—Sheet 4.
J. TIFFANY.
BRICK MACHINE.
No. 309,367. Patented Dec. 16, 1884.
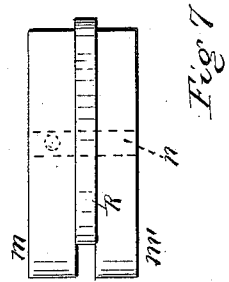
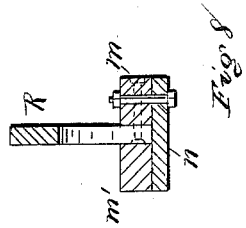
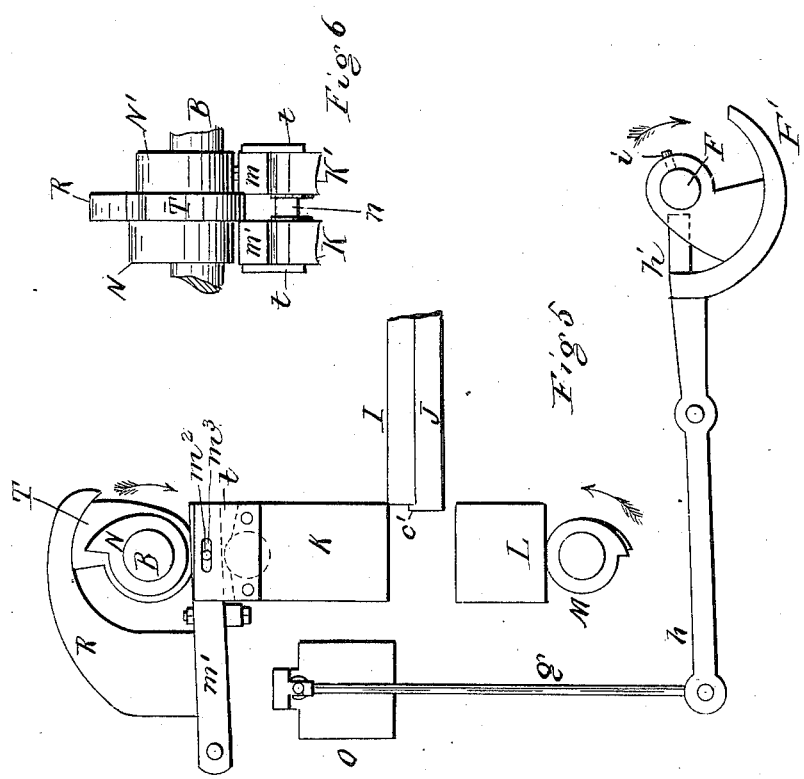
Witnesses
P. E. Rermemo.
W. C. Coolies
Inventor
Joel Tiffany
By Coburn & Thacher
Attorneys

UNITED STATES PATENT OFFICE.

JOEL TIFFANY, OF HINSDALE, ILLINOIS.

BRICK-MACHINE.

SPECIFICATION forming part of Letters Patent No. 309,367, dated December 16, 1884.

Application filed June 14, 1884. (No model.)

*To all whom it may concern:*

Be it known that I, JOEL TIFFANY, a citizen of the United States, and residing at Hinsdale, in the county of Du Page and State of Illinois, have invented certain new and useful Improvements in Brick-Machines, which are fully set forth in the following specification, reference being had to the accompanying drawings, in which—
Figure 1 is a plan view of a brick-machine containing my improvements and showing one set of dies, duplicate parts being broken away. Fig. 2 is an end elevation of same; Fig. 3, a cross-section of same, taken on line $x$ $x$, Fig. 1; Fig. 4, a longitudinal vertical section taken on line $y$ $y$, Fig. 1. Fig. 5 is a detail view showing operating parts of the dies and discharging mechanisms; Fig. 6, an inside detail elevation of the upper cams; Fig. 7, a plan view of the levers of the upper dies; and Fig. 8, a transverse section of same, taken on line $z$ $z$, Fig. 7.

My improvements relate to that class of machines which are used for manufacturing pressed brick, and in the drawings A is the band-wheel, attached to the main driving-shaft B. C, D, E, X, and Y are burr-pinions through which power is communicated to the shafts F and G, which give power to certain of the devices for carrying on different parts of the operation of brick-making.

In the manufacture of bricks with one of my machines the clay, which has been already properly prepared, is placed in the hopper H, and is from that fed into the feeder I and mold J, filling them both. The clay having been fed into the feeder and mold, they are pushed forward between the dies K and L.

The manner of bringing them forward is as follows: The pin $a$ on the wheel E' strikes the lug $b$, which is attached to the arm I' of the feeder I, and shoves the feeder in toward the dies. The cleat or shoulder $c$ on the outer end of the feeder catches the end of the mold J, and so carries the mold J along with the feeder I between the dies. The feeder and mold are each as deep as the intended thickness of the finished brick, so that when the material is all forced into the mold by the action of the dies it is compressed into one-half the space it occupies when introduced into the feeder and mold. To accomplish this, the dies are so arranged and worked that the cam M brings the lower die, L, up to a level with the lower surface of the mold. The upper die, however, begins to press the clay down before the lower die begins to rise, and thus pushes some of the clay down below the lower surface of the mold J. Soon, however, the cam M begins to bring the die up, and thus the dies are pressing simultaneously upon both sides of the brick, and the upper die comes down level with the upper side of the mold J, and the lower die comes up to a level with its lower surface. In this operation the lower die does not at any time enter the mold J, while the upper die passes down through the whole depth of the feeder I to the bottom thereof. By the time that the dies have thus compressed the material into a brick of the desired size and shape, and before they are withdrawn from the surfaces of the brick, the pin $d$ on the wheel E' has come around and engaged with the lug $e$ on the arm of the mold J, and pushed the mold forward, so as to allow the plunger O to come down and force the brick out of the mold onto the table $f$. By thus pushing out the brick before the dies are withdrawn, there is no danger of any part of the brick material adhering to the face of the die. The plunger O is operated by means of a connecting-rod, $g$, at each side thereof, pivoted, as shown in Fig. 5, to one end of a vibrating lever, $h$, pivoted near its center, and having its other end arranged in the path of a pin or projection, $i$, on the shaft F. This shaft is also provided with a cam, F', arranged to engage the curved arm $h'$ of the lever $h$. The shaft revolving in the direction of the arrow, Fig. 5, by means of the pinion X thereon, which meshes with pinion E, the pin $i$ engages the end of lever $h$ and raises it, thereby lowering the plunger. The cam F' then engages the arm $h'$ and forces it and the end of the lever $h$ to which it is attached downward, thereby raising the plunger. The cam rides on the curved upper surface of the arm and holds the plunger up until the mold is fed forward under it, when the above operation is repeated. When the plunger O has done its work and retreated above the mold J, the friction-wheel Q, which is pinned to the wheel E², has come round into position to engage the lug k on the arm of the mold J, and, pushing against k, pushes the mold back under the hopper, and by means of the cleat c' it also carries the feeder I back with it into position to receive more material from the hopper. The die L resumes its position by gravitation, and the die K is lifted by the cam projection R. This cam projection is securely bolted to the arm m, which is fastened to the die, and after pressing the upper die down by the cam N the cam T, which is attached to the same shaft, comes around, and, working under the cam projection R, raises it and with it the die. As the molds are made double—i. e., two side by side in the same plate—it is of course necessary to have two sets of dies side by side. These are worked in the same manner and by cams exactly alike, but placed in different positions on the shaft B. However, as the dies are to be raised both at the same time, there is but one cam projection R, which is attached to the arm m, attached to one of the dies K. On the under side of the arm m is fastened the cross-arm n. This cross-arm passes under the arm m', and when the cam projection R is raised it lifts the arm m, and by means of the cross-arm n the arm m' is also raised, thus carrying both arms up at the same time and by the same mechanism lifts the dies simultaneously. The arms m m' are connected to the dies K by means of pins m², passing through slots m³ in plates t, attached to the dies, the necessary play between these parts being thereby obtained; and to lessen the friction between the arms and the dies a roller, K', is mounted in the upper end of each die, as shown in Fig. 4, against which the arms m m' bear, the head of the dies being beveled off, so that the arms will bear upon the rollers only.

The machine is designed to make eight bricks at a time, and the cams N N', &c., are so arranged on the shaft B as to press down the dies one after the other, and bringing on the machine at one time only the strain necessary to make one brick. Each cam N is placed forty-five degrees farther around on the shaft B than the cam immediately preceding it. Each of the cams T is ninety degrees farther around on the shaft than the one next preceding it.

The cams, pins, eccentrics, and stops are so arranged and timed as to work with reference to one another and without danger of interfering one movement with another.

The plates t form stops to prevent the dies K from descending too far, the said plates projecting so as to catch upon the top of the guides in which the dies slide, as shown in Fig. 3.

To prevent the feeder I from going too far, a stop, c, is attached to it, as shown in Fig. 4.

The mold and feeder-plates are solid from the matrices out, thereby closing the bottom of the hopper when the molds are pushed forward between the dies.

I am aware that it is not new to form bricks by pressing the clay in a mold between two dies or plungers, and I do not claim the same, broadly.

Having now fully described my invention, what I claim as new, and desire to secure by Letters Patent, is—

1. In a brick-machine, the combination, with the upper and lower dies, of the movable mold and the feeder mounted thereon, and means, substantially as described, for operating the same, substantially as and for the purposes specified.

2. In a brick-machine, the combination, with the upper and lower dies and the plunger O, of the feeder I, having lug b, the mold J, having lugs e and k and shoulder c', and the wheels E' E², having projections to engage the said lugs, substantially as and for the purposes specified.

3. In a brick-machine, the combination, with the dies K and the pivoted arms connected thereto, and provided with the cam projection R, of the shaft B, having cams N N' to lower the dies, and a cam, T, to engage the projection R to raise the dies, substantially as and for the purposes set forth.

4. In a brick-machine, the combination, with the dies K, of the pivoted arms m m', connected thereto, substantially as described, one of said arms being provided with cam projection R and cross-arm n, and of shaft B, having cams N N' arranged thereon to operate successively to lower the dies one at a time, and cams T to raise each pair of dies simultaneously, substantially as and for the purposes specified.

5. In a brick-machine, the combination, with the upper dies, of cams arranged to lower the said dies successively, and other cams arranged to raise the said dies in pairs successively, substantially as and for the purposes specified.

6. In a brick-machine, the combination, with the dies K, having rollers K' and slotted plates t, of the pivoted arms m m', having pins m², entering the slots, and means for operating the said arms, substantially as and for the purposes set forth.

7. In a brick-machine, the combination, with the plunger O, of the lever h, connected thereto by rods g, and having curved arm h', and shaft F, having pin i and cam F', substantially as and for the purposes set forth.

8. In a brick-machine, the combination, with the upper and lower dies arranged in pairs, each consisting of an upper and a lower die, of means for actuating said pairs of dies successively, substantially as and for the purposes set forth.

JOEL TIFFANY.

Witnesses:
G. E. FAULKNER,
LEONARD WATSON.